United States Patent
Takehara et al.

(10) Patent No.: US 11,225,037 B2
(45) Date of Patent: Jan. 18, 2022

(54) METHOD OF PRODUCING FIBER-REINFORCED COMPOSITE MATERIAL, RESIN BASE MATERIAL AND PREFORM

(71) Applicant: Toray Industries, Inc., Tokyo (JP)

(72) Inventors: Tomohiro Takehara, Ehime (JP); Satoshi Seike, Nagoya (JP); Masato Honma, Ehime (JP); Satomi Matsuo, Ehime (JP)

(73) Assignee: Toray Industries, Inc., Tokyo (JP)

( * ) Notice: Subject to any disclaimer, the term of this patent is extended or adjusted under 35 U.S.C. 154(b) by 398 days.

(21) Appl. No.: 15/519,342

(22) PCT Filed: Oct. 8, 2015

(86) PCT No.: PCT/JP2015/078644
§ 371 (c)(1),
(2) Date: Apr. 14, 2017

(87) PCT Pub. No.: WO2016/060062
PCT Pub. Date: Apr. 21, 2016

(65) Prior Publication Data
US 2017/0239895 A1    Aug. 24, 2017

(30) Foreign Application Priority Data

Oct. 17, 2014  (JP) .............................. JP2014-212425
Oct. 17, 2014  (JP) .............................. JP2014-212426

(51) Int. Cl.
| | |
|---|---|
| *B29C 70/40* | (2006.01) |
| *B29C 70/08* | (2006.01) |
| *B32B 3/26* | (2006.01) |
| *B32B 27/12* | (2006.01) |
| *B32B 27/20* | (2006.01) |

(52) U.S. Cl.
CPC ............ *B29C 70/40* (2013.01); *B29C 70/086* (2013.01); *B32B 3/266* (2013.01); *B32B 27/12* (2013.01); *B32B 27/20* (2013.01)

(58) Field of Classification Search
CPC ..................................................... B32B 27/12

USPC ......................................................... 156/242
See application file for complete search history.

(56) References Cited

U.S. PATENT DOCUMENTS

| | | | | |
|---|---|---|---|---|
| 8,361,265 | B2* | 1/2013 | Wadahara | B29C 43/003 |
| | | | | 156/242 |
| 10,072,377 | B2* | 9/2018 | Shimizu | C08J 5/24 |
| 2010/0239856 | A1* | 9/2010 | Olson | B29C 70/465 |
| | | | | 428/339 |
| 2011/0294387 | A1* | 12/2011 | Simmons | B32B 5/26 |
| | | | | 442/376 |
| 2014/0037939 | A1* | 2/2014 | Misumi | C08J 5/24 |
| | | | | 428/327 |
| 2015/0291767 | A1* | 10/2015 | Owada | C03C 12/00 |
| | | | | 524/611 |

FOREIGN PATENT DOCUMENTS

| | | |
|---|---|---|
| JP | 9-085866 A | 3/1997 |
| JP | 9-169058 A | 6/1997 |
| JP | 11-254602 A | 9/1999 |
| JP | 3151365 B2 | 4/2001 |
| JP | 2002-034816 A | 2/2002 |
| JP | 2011-236274 A | 11/2011 |
| JP | 2012-071591 A | 4/2012 |
| JP | 2012-200680 A | 10/2012 |
| JP | 2014-069564 A | 4/2014 |
| WO | 2012/133096 A1 | 10/2012 |
| WO | 2012/147401 A1 | 11/2012 |
| WO | WO-2012147401 A1 * | 11/2012 ................ C08J 5/24 |
| WO | WO-2013015299 A1 * | 1/2013 ................ C08J 5/24 |

* cited by examiner

*Primary Examiner* — Matthew J Daniels
*Assistant Examiner* — Hana C Page
(74) *Attorney, Agent, or Firm* — DLA Piper LLP (US)

(57) ABSTRACT

A production method for a fiber reinforced composite material includes heating a preform formed by laminating a prepreg layer (I) including a reinforcement fiber (A) and a thermosetting resin (B-1) with a resin layer (II) including a thermosetting resin (B-2) and a solid additive (C) to cure the thermosetting resin (B-1) and the thermosetting resin (B-2), the cured resin layer (II') formed by curing the resin layer (II) having an average thickness of 35 μm or more and 300 μm or less.

8 Claims, No Drawings

METHOD OF PRODUCING FIBER-REINFORCED COMPOSITE MATERIAL, RESIN BASE MATERIAL AND PREFORM

TECHNICAL FIELD

This disclosure relates to a method of producing a fiber reinforced composite material having a coating layer, a resin base material to form a coating layer, and a preform thereof.

BACKGROUND

Fiber reinforced composite materials including reinforcement fiber compounded with a matrix resin have good features such as lightweightness, good mechanical properties, high dimensional stability and the like and, therefore, they have been widely used in such fields including transportation equipment such as aircraft, electrical and electronic instruments, sporting goods, and building materials. In general, products using fiber-reinforced composite materials are coated by coating or the like with the aim of enhancing surface protection and designability.

As a method of coating fiber reinforced composite materials, Japanese Unexamined Patent Publication (Kokai) No. 2012-200680 discloses a technique to form a coat film containing a light interference pigment over the surface of a molded article of a fiber reinforced composite material. Japanese Unexamined Patent Publication (Kokai) No. 2002-34816 discloses a method of producing a colored fiber reinforced composite material by forming a gel coat on a mold and putting a preform of a fiber reinforced composite material on it, followed by curing. Japanese Unexamined Patent Publication (Kokai) No. 2014-69564 discloses a method that does not require a coating step to produce a highly weather resistant fiber reinforced composite material by covering the surface with a thermosetting resin sheet containing an ultraviolet absorbent. Japanese Unexamined Patent Publication (Kokai) No. 2011-236274 discloses a method of producing a colored fiber reinforced composite material by attaching a thermoplastic resin film-like coloring material to a fiber reinforced resin preform and molding it by heating and pressing. International Publication WO 2012/133096 discloses a method in which a coat layer is formed on the surface of a prepreg using crosslinked resin particles and the prepreg is laminated and molded by heating and pressing. Japanese Patent No. 3151365 discloses a method in which a patterning sheet is put on a molding composition, followed by heating and pressing to produce a molded article having a pattern on the surface.

As described above, various methods of applying a coating to a fiber reinforced composite material are known. However, although the method of applying a coating to a molded article of a fiber-reinforced composite material as disclosed in JP '680 can produce a molded article having excellent appearance, it has the disadvantage that a step of molding the fiber reinforced composite material and a step of curing the coating film are separately required and that the process is complicated because the coating step requires multiple stages for polishing the material surface, various washing operations, degreasing with solvents, and sequential application of a clear primer, coloring paint, and clear paint. Similarly, the method of applying a gel coat to a mold as disclosed in JP '816 has the disadvantage of requiring a complicated process containing steps for spraying a gel coating to the mold and washing the mold although it has the advantage that the gel coat layer and the preform of a fiber reinforced composite material can be cured simultaneously.

The method disclosed in JP '564, which uses a thermosetting resin sheet, has the disadvantage that the effect of the ultraviolet absorber cannot be realized sufficiently because a flow of the thermosetting resin during curing causes the ultraviolet absorber to move to the interior of the reinforcement fiber in the prepreg to make it impossible for the ultraviolet absorber to be present densely near the surface of the molded article in spite of the advantage that a coating step is unnecessary to allow a fiber reinforced composite material having a coat layer to be prepared easily. The method disclosed in JP '274 can produce a fiber reinforced composite material having a colored coat layer with a constant film thickness by attaching a film-like colored base material of a thermoplastic resin to the surface of a prepreg that contains a thermosetting resin as matrix resin. However, depending on the combination of the thermoplastic resin and the thermosetting resin used as matrix resin, there can be a disadvantage that the thermoplastic resin film that forms the coat layer fails to be sufficiently adhered and suffers from peeling off.

Although the method disclosed in JP '096 can produce a coat layer on the surface of a molded article of a fiber reinforced composite material by using crosslinked resin particles, the method aims main to prevent a unidirectional carbon fiber prepreg from having an uneven appearance and cannot serve sufficiently to suppress the sinking of crosslinked resin particles into the reinforcement fiber that is attributed to a resin flow during the molding step and consequently, the surface of the resulting molded article of the fiber reinforced composite material shows a mottled pattern and fails to have an appearance of good design.

In JP '365, the surface of a pattern layer is laminated with a reinforcing sheet to prevent breakage of the pattern layer, and a shielding mat is added to prevent the molding material such as SMC, from flowing into the pattern layer during molding. That method prevents breakage of the pattern layer and deformation of the pattern during conveyance or molding. However, it has the disadvantage that formation of the pattern layer is realized through a multi-step process containing coating, coating, drying, and curing and in addition, the formation of a shielding mat requires a semi-curing step after a thermosetting resin impregnation step, further complicating the process. To prevent passage of the molding material, furthermore, additional techniques are used to increase the thickness of the shielding mat and fill the voids with a thermosetting resin, followed further by a semi-curing step, resulting in an increase in the weight of molded articles and degradation of their mechanical properties.

In view of the above problem with the conventional technology, it could be helpful to provide a method of producing a fiber reinforced composite material having a highly processable coat layer (the simple term "resin layer" refers a resin layer before undergoing a curing step, whereas a resin layer after undergoing a curing step is defined as a cured resin layer and the cured resin layer that forms the outermost layer of a molded article is defined as a coat layer).

SUMMARY

We found that, when a resin layer composed of a thermosetting resin and a pigment was spread over a prepreg composed of a reinforcement fiber and a thermosetting resin, followed by curing, there occurred a problem of drifting of the reinforcement fiber during the molding step, resulting in a coat layer with a decreased thickness. We also found that it is helpful to depress the drifting of the reinforcement fiber in the thickness direction during a step in which the curing of a resin layer and the curing of a fiber reinforced composite material are performed simultaneously so that the decrease in thickness of the resin layer is depressed to ensure the formation of a coat layer with an intended thickness.

We thus provide:

(1) A production method for a fiber reinforced composite material including a step of heating a preform formed by laminating a prepreg layer (I) including a reinforcement fiber (A) and a thermosetting resin (B-1) with a resin layer (II) including a thermosetting resin (B-2) and a solid additive (C) to cure the thermosetting resin (B-1) and the thermosetting resin (B-2), the cured resin layer (II') formed by curing the resin layer (II) having an average thickness of 35 µm or more and 300 µm or less.

(2) A production method for a fiber reinforced composite material as set forth in paragraph (1), wherein the resin layer (II) contains inorganic filler (D) or a porous sheet-like base material having continuous holes (E) that acts as spacer.

(3) A production method for a fiber reinforced composite material as set forth in paragraph (2), wherein the spacer is a porous sheet-like base material having continuous holes (E) and the hole diameter Le of the porous sheet-like base material (E) meets the relation of Le<Lc where Lc is the average of the longest diameters across the primary particles of the solid additive (C).

(4) A production method for a fiber reinforced composite material as set forth in any one of paragraphs (1) to (3), wherein the preform is such that a layer (III) formed mainly of a porous sheet-like base material having continuous holes (E') is present between the layer (I) and the resin layer (II).

(5) A production method for a fiber reinforced composite material as set forth in paragraph (4), wherein the hole diameter Le' of the porous sheet-like base material (E') meets the relation of Le'<Lc where Lc is the average of the longest diameters across the primary particles of the solid additive (C).

(6) A production method for a fiber reinforced composite material as set forth in any one of paragraphs (1) to (5), wherein the curing rate of the thermosetting resin (B-1) is higher than the curing rate of the thermosetting resin (B-2).

(7) A production method for a fiber reinforced composite material as set forth in any one of paragraphs (1) to (6), wherein: the resin layer (II) further includes an inorganic filler (D) as spacer; the average of the shortest diameters Lc1 across the primary particles of the solid additive (C) is 0.25 µm or more and less than 20 µm; the average of the shortest diameters Ld1 across the particles of the inorganic filler (D) is 20 µm or more and 100 µm or less; the solid additive (C) accounts for 0.01% to 20% by volume in the resin layer (II); and the inorganic filler (D) accounts for 1% to 50% by volume.

(8) A production method for a fiber reinforced composite material as set forth in any one of paragraphs (1) to (7), wherein the particles of the solid additive (C) have a flattened shape with an aspect ratio of 1.2 or more and 300 or less.

(9) A production method for a fiber reinforced composite material as set forth in any one of paragraphs (1) to (8), wherein the average of the longest diameters Lc2 across the dispersed particles of the solid additive (C) is 0.25 µm or more and 300 µm or less.

(10) A production method for a fiber reinforced composite material as set forth in any one of paragraphs (1) to (9), wherein the resin layer (II) further includes inorganic filler (D) as spacer and the particles of the inorganic filler (D) have an aspect ratio of 1 or more and 3 or less.

(11) A production method for a fiber reinforced composite material as set forth in any one of paragraphs (1) to (10), wherein the resin layer (II) further includes a porous sheet-like base material having continuous holes (E) as spacer and the porous sheet-like base material having continuous holes (E) is a nonwoven fabric, a woven fabric, or a porous film.

(12) A resin base material designed to be laminated on the surface of a fiber reinforced preform and heated together with the fiber reinforced preform to achieve molding thereof and including a thermosetting resin (B-2), a solid additive (C), and a spacer, the spacer being either an inorganic filler (D) or a porous sheet-like base material having continuous holes (E).

(13) A resin base material as set forth in paragraph (12), wherein: the average of the shortest diameters Lc1 across the primary particles of the solid additive (C) is 0.25 µm or more and less than 20 µm; the average of the shortest diameters Ld1 across the particles of the inorganic filler (D) is 20 µm or more and 100 µm or less; the solid additive (C) accounts for 0.01% to 20% by volume; and the inorganic filler (D) accounts for 1% to 50% by volume.

(14) A resin base material as set forth in either paragraph (12) or (13), wherein the particles of the solid additive (C) have a flattened shape with an aspect ratio of 1.2 or more and 300 or less.

(15) A resin base material as set forth in any one of paragraphs (12) to (14), wherein the average of the longest diameters Lc2 across the dispersed particles of the solid additive (C) is 0.25 µm or more and 300 µm or less.

(16) A resin base material as set forth in any one of paragraphs (12) to (15), wherein the spacer is inorganic filler (D) and the particles of the inorganic filler (D) have an aspect ratio of 1 or more and 3 or less.

(17) A resin base material as set forth in any one of paragraphs (12) to (15), wherein the spacer is a porous sheet-like base material having continuous holes (E) and the hole diameter Le of the porous sheet-like base material having continuous holes (E) meets the relation of Le<Lc where Lc is the average of the longest diameters across the primary particles of the solid additive (C).

(18) A resin base material as set forth in either paragraph (12) or (17), wherein the spacer is a porous sheet-like base material having continuous holes (E) and the porous sheet-like base material having continuous holes (E) is a nonwoven fabric, a woven fabric, or a porous film.

(19) A preform including a prepreg layer (I) containing a reinforcement fiber (A) and a thermosetting resin (B-1), a resin layer (II) stacked thereon and containing a thermosetting resin (B-2) and a solid additive (C), and a layer (III) present therebetween and containing a porous sheet-like base material having continuous holes (E'), the hole diameter Le' of the porous sheet-like base material (E') meeting the relation of Le'<Lc where Lc is the average of the longest diameters across the primary particles of the solid additive (C).

(20) A preform as set forth in paragraph (19), wherein the a porous sheet-like base material having continuous holes (E') is a nonwoven fabric, a woven fabric, or a porous film.

It is thus possible to provide a production method for a fiber reinforced composite material having excellent processability to ensure reduction in the number of working steps and shortening of the processing time, while suppressing the reduction in the thickness of the resin layer on the surface of the resulting molded article that is attributed to drifting of the reinforcement fiber during the molding step.

DETAILED DESCRIPTION

Our methods, materials and preforms are described in detail below.

Preform

To produce a fiber reinforced composite material having a coat layer at the surface, we use a preform that includes at least one or more prepreg ply and a resin layer (II) stacked thereon and containing a solid additive (C). As a result, a fiber reinforced composite material having a coat layer can be produced in a simpler manner as compared to the case where a molded article is produced first from a prepreg followed by forming a coat layer by coating.

The preform is a laminate of a prepreg layer (I) containing a reinforcement fiber (A) and a thermosetting resin (B-1) and a resin layer (II) containing a thermosetting resin (B-2) and a solid additive (C).

For the preform, the resin layer (II) preferably has a thickness of 50 μm or more and 500 μm or less to ensure that the cured resin layer (II') obtained after the curing step will have a thickness as described later. If the thickness is less than 50 μm, an outflow of the resin from the preform may occur during the molding step and have a large effect resulting even in the failure to form a coat layer. Also, a thickness of more than 500 μm will not have a significant effect for producing a coat layer with an increased thickness. The thickness of the resin layer (II) is more preferably 100 μm or more and 400 μm or less. When the preform contains a plurality of resin layers (II) (for example, when a resin layer (II) is present on each of the two surfaces of the prepreg layer (I)), the term "thickness of the resin layer (II)" refers to the thickness of each resin layer (II) separately, and at least one resin layer (II) present on either surface of the preform preferably has a thickness in the range given above. It is more preferable for each of the two resin layers (II) present on both surfaces to have a thickness in the range given above.

Production of Fiber Reinforced Composite Material

A fiber reinforced composite material with the surface covered with a coat layer constituted of a cured resin layer (II') can be produced by curing the preform. A variety of generally known methods are available for molding a fiber reinforced composite material using a prepreg containing reinforcement fibers impregnated with a thermosetting resin in an uncured or semicured state. In a preferred method, for instance, prepreg sheets are cut to a predetermined size, and a resin layer (II) as described above is formed on at least part of the surface of a sheet or a laminate of a predetermined number of sheets, followed by heat-cured under a pressure.

Such heat-curing of a preform under a pressure can be carried out by any appropriate method that can perform pressure molding under heat such as autoclave molding, press molding, vacuum molding, air-pressure molding, and vacuum pressure molding. Of these, press molding and vacuum molding have been preferred because of small equipment cost, simple operation, high molding speed, and suitability for mass production.

The temperature for heat-curing a preform should be set appropriately depending on the combination of the thermosetting resin (B-1) and the thermosetting resin (B-2) to be used, but it is usually 80° C. to 220° C. The use of an appropriate molding temperature makes it possible to obtain an adequate fast curing rate and depress the generation of warp due to thermal strain.

When a fiber reinforced composite material is produced by press molding, the molding pressure is normally 0.1 to 5 MPa depending on the thickness, Wf (weight content of reinforcement fiber), or the like of the material being molded. A molding pressure in this range allows the resulting fiber reinforced composite material to be free of defects such as voids and makes it possible to produce a fiber reinforced composite material free of warp or other size variations.

In a fiber reinforced composite material as produced above, the coat layer, i.e., the cured resin layer (II') present at the outer surface of the molded article, preferably has an average thickness T of 35 μm or more and 300 μm or less. The solid additive (C) will perform the functions described later very effectively when the coat layer has an average thickness T of 35 μm or more. On the other hand, the thickness has little effect on the performance of the functions if the thickness is increased to above 300 μm. The average thickness T of a coat layer as referred to herein is determined by observing a cross section of a molded article by a microscope, measuring the distance between the surface and the reinforcement fiber in the molded article at 20 points, and calculating the average of the distance measurements. When a cured cloth prepreg is to be examined, a strand in which the fibers stand perpendicular to the surface under observation is selected, and after dividing the strand into three parts, the central region is observed.

Structure of Preform

A preform is a laminate of a prepreg layer (I) containing a reinforcement fiber (A) and a thermosetting resin (B-1) and a resin layer (II) containing a thermosetting resin (B-2) and a solid additive (C), as described above.

It is preferable for the resin layer (II) to contain inorganic filler (D) or a porous sheet-like base material having continuous holes (E) that acts as spacer. A continuous hole means a continuous through-hole. A through-hole means a hole penetrating at least from one surface to the other surface, and continuous through-holes are such throughholes connected to each other to form a three dimensionally communicating structure. The addition of inorganic filler particles of a specific size or a porous sheet-like base material having continuous holes of a specific shape to the resin layer (II) serves to depress the drifting of the reinforcement fiber into the resin layer (II) and prevent the resin layer (II) from thinning during the molding step.

In a resin layer (II) in which a porous sheet-like base material having continuous holes are contained as spacer, the continuous holes in the porous sheet-like base material (E) preferably has a hole diameter Le that meets the relation of Le<Lc where Lc is the average of the longest diameters across the primary particles of the solid additive (C). If the hole diameter Le meets this requirement, the passage of the solid additive (C) through the porous sheet-like base material having continuous holes (E) can be controlled so that the solid additive (C) in the resin layer (II) is localized in the region on the preform surface side or in the region on the prepreg layer (I) side from the porous sheet-like base material having continuous holes (E) or so that it is allocated at a desired ratio between the region on the preform surface side and the region on the prepreg layer side (I) from the porous sheet-like base material having continuous holes (E). In particular, it is preferable for the solid additive (C) to be localized near the surface of the resin layer (II) opposite to that faces the prepreg layer (I). If the solid additive (C) is localized near the surface while the porous sheet-like base material (E) is localized near the prepreg layer (I) (accordingly, the porous sheet-like base material (E) is present nearer to the prepreg layer (I) than the solid additive (C)), it is preferable because the solid additive (C) can be localized near the surface of the coat layer in the molded article, i.e., the cured resin layer (II') produced by the curing step, which serves for effective performance of functions.

A fiber reinforced composite material may be produced by using a preform composed of a prepreg layer (I) containing a reinforcement fiber (A) and a thermosetting resin (B-1), a resin layer (II) containing a thermosetting resin (B-2) and a solid additive (C), and a layer (III) of a porous sheet-like base material having continuous holes (E') that is interposed therebetween. The use of a porous sheet-like base material having continuous holes of a specific shape allows the layer (III) of a porous sheet-like base material (E') to act as a spacer and serves to depress the drifting of the reinforcement fiber into the resin layer (II) during molding, thus preventing the resin layer after molding from thinning. When the resin layer (II) contains a porous sheet-like base material (E) as spacer, the porous sheet-like base material (E') may be either the same as or different from the porous sheet-like base material (E).

In a laminate of a prepreg layer (I) containing a reinforcement fiber (A) and a thermosetting resin (B-1), a resin layer (II) containing a thermosetting resin (B-2) and a solid additive (C), and a layer (III) of a porous sheet-like base material having continuous holes (E') that is interposed therebetween, the hole diameter Le' of the porous sheet-like base material having continuous holes (E') preferably meets the relation of Le'<Lc where Lc is the average of the longest diameters across the primary particles of the solid additive (C). If the hole diameter Le' meets this requirement, it is preferable because the solid additive (C) can be prevented from passing through the porous sheet-like base material having continuous holes (E') and allow the solid additive (C) to be localized near the surface of the coat layer in the molded article, i.e., the cured resin layer (II') produced by the curing step, thus serving for effective performance of functions.

The hole diameters Le and Le' of the porous sheet-like base materials having continuous holes (E) and (E') are peak top values in the distributions obtained by the mercury intrusion method. On the other hand, the average of the longest diameters Lc across the primary particles of the solid additive (C) is determined by dispersing the solid additive (C) in water or an organic solvent and casting it on a slide glass to prepare a sample, which is observed by a microscope. The longest diameter across a particle of the solid additive (C) is measured at 100 points and the average is calculated.

The coat layer formed by curing the resin layer (II) in the preform is formed of a cured product of the thermosetting resin (B-2) and the solid additive (C). A coat layer produced by curing a preform containing a resin layer (II) that is composed of a thermosetting resin (B-2), a solid additive (C), and an inorganic filler (D) consists of the cured product of the thermosetting resin (B-2), the solid additive (C), and the inorganic filler (D), whereas a coat layer produced by curing a preform containing a resin layer (II) that is composed of a thermosetting resin (B-2), a solid additive (C), and a porous sheet-like base material having continuous holes (E) consists of the cured product of the thermosetting resin (B-2), the solid additive (C), and the porous sheet-like base material having continuous holes (E). Compared to this, a coat layer produced by curing a preform containing a resin layer (II) composed of a thermosetting resin (B-2) and a solid additive (C), a prepreg layer (I) stacked thereon, and a porous sheet-like base material having continuous holes (E') interposed therebetween consists of the cured product of the thermosetting resin (B-2), the solid additive (C), and the porous sheet-like base material having continuous holes (E'). The localized existence of the solid additive (C) in the coat layer allows the solid additive (C) to perform its functions, which will be described later, effectively without being confined among reinforcement fibers. The coat layer may contain the cured product of the thermosetting resin (B-1).

Structure of Resin Base Material

A resin base material that includes a thermosetting resin (B-2), a solid additive (C), and a spacer, which spacer is either an inorganic filler (D) or a porous sheet-like base material having continuous holes (E), can be used as a resin base material component that is spread over the surface of a fiber reinforced preform and subjected to heating and molding together with the fiber reinforced preform. The use of such a resin base material forms a coat layer on any surface of an appropriate molded article. The term "fiber reinforced preform" typically refers to the prepreg layer (I) described previously, but it is not limited to this and may refer to any material that contains a reinforcement fiber and a matrix resin that can form the main part of a molded article. The main part of a molded article refers to the part that constitutes the major portion of the molded article excluding the coat layer. For such a resin base material, furthermore, the preferred features of the thermosetting resin (B-2), solid additive (C), and inorganic filler (D) or porous sheet-like base material having continuous holes (E) are the same as those described above for the resin layer (II).

For the resin base material, the continuous holes in the porous sheet-like base material (E) preferably has a hole diameter Le that meets the relation of Le<Lc where Lc is the average of the longest diameters across the primary particles of the solid additive (C). If the hole diameter Le meets this requirement, the passage of the solid additive (C) through the porous sheet-like base material having continuous holes (E) can be controlled so that the solid additive (C) in the resin base material is localized in only one side of the resin base material or allocated at a desired ratio between two halves of the resin base material. In particular, it is preferable for the solid additive (C) in the resin base material to be localized only in one side of the resin base material so that the solid additive (C) is present near the opposite surface of the resin base material to that faces the fiber reinforced preform. Thus, the solid additive (C) will be localized near the surface of the resulting molded article while the porous sheet-like base material (E) will be localized near the fiber reinforced preform (accordingly, the porous sheet-like base material (E) is present nearer to the fiber reinforced preform than the solid additive (C)), which is preferable because the solid additive (C) can be localized near the surface of the coat layer in the molded article, i.e., the resin base material after being cured, to enable effective performance of functions.

Materials

The solid additive (C) is added with the aim of allowing the fiber reinforced composite material to have specific functions.

Such functions include, for example, design characteristics (such as colors, pearly appearance, and metallic appearance), electromagnetic shielding, electric conduction, fire retardance, and weather resistance.

Examples of the solid additive (C) that can develop design characteristics include pigments and glass beads. More specifically, they include organic pigments such as azo pigments and phthalocyanine blue; metal pigments of powder metals such as aluminum and brass; and inorganic pigments such as chrome oxide and cobalt blue. In particular, metal pigments and inorganic pigments are preferable from the viewpoint of heat resistance. When a dark colored material such as carbon fiber and aramid fiber is contained as reinforcement fiber, the use of a pigment having two or more layer structures that differ in refractive index has been preferred. Examples include natural mica, artificial mica, alumina flakes, silica flakes, and glass flakes cladded with titanium oxide or iron oxide. Such a layered structure works to develop colors attributed to optical phenomena such as interference, diffraction, and scattering of light in the visible light region. Optical phenomena such as interference, diffraction, or scattering of light serve for color development based on reflection of light with a specific wavelength and they are utilized favorably in materials that contain dark colored reinforcement fiber.

Examples of the solid additive (C) that serve for electromagnetic shielding and electric conduction include powder of metals such as silver, copper, and nickel, as well as ferrite and carbon black.

Examples of the solid additive (C) that can develop fire retardance include phosphorus compounds, antimony compounds, metal hydroxides, zinc compounds, and melamine cyanurate.

Examples of the solid additive (C) that can develop weather resistance include ultraviolet absorber and hindered amine based photostabilizers.

The average of the shortest diameters $Lc1$ across the primary particles of the solid additive (C) is preferably 0.25 μm or more and less than 20 μm. If it is in this range, the solid additive (C) can be localized in the coat layer without being confined among reinforcement fibers. The average of the shortest diameters $Lc1$ across the primary particles as referred to here is determined by dispersing the solid additive (C) in water or an organic solvent and casting it on a slide glass to prepare a sample, which is observed by a microscope. The difference in the depth of focus between the top face of the slide glass and the top face of the solid additive (C) is measured at 100 points and the average is calculated.

The particles of the solid additive (C) preferably have a flattened shape with an aspect ratio of 1.2 or more and 300 or less. Having such a shape, the particles of the solid additive (C) are prevented from being confined among reinforcement fibers.

The average of the longest diameters $Lc2$ across the dispersed particles of the solid additive (C) is preferably 0.25 μm or more and 300 μm or less. If it is more than 300 μm, the thickness of the resin layer may increase locally in the region where the solid additive (C) exists. The average $Lc2$ referred to here is determined by observing a cross section of a molded article by a microscope, measuring the longest diameter across a particle of the solid additive (C) at 100 points, and calculating the average of the measurements.

The inorganic filler (D) is an inorganic solid material in the form of particles of a shape such as sphere, ellipse, and polyhedron. Useful materials include, for example, glass, silica, mica, titanium dioxide, and aluminum oxide. In particular, the use of glass, silica, or mica is preferred from the viewpoint of the difference in refractive index from the thermosetting resin as described later. The average of the shortest diameters across the particles of the inorganic filler (D), $Ld1$, is preferably 20 μm or more and 100 μm or less. The average of the shortest diameters as referred to here is determined by dispersing the inorganic filler in water or an organic solvent and casting it on a slide glass to prepare a sample, which is observed by a microscope. The difference in the depth of focus between the top face of the slide glass and the top face of the filler is measured at 100 points and the average is calculated.

If the average of the shortest diameters across the particles of the inorganic filler (D), $Ld1$, is in this range, the drifting of the reinforcement fiber into the resin layer can be depressed. As a result, the decrease in the thickness of the resin layer is depressed and a state where the solid additive (C) is localized near the surface without being confined among reinforcement fibers is maintained, thereby enabling effective development of functions. If the average of the shortest diameters, $Ld1$, is less than 20 μm, the reinforcement fiber can drift into the resin layer to cause a considerable decrease in the thickness of the coat layer. On the other hand, even if the average of the shortest diameters, $Ld1$, is increased to more than 100 μm to form a coat layer with an increased thickness, it may not contribute to the development of functions.

The particles of the inorganic filler (D) preferably have an aspect ratio of 1 or more and 3 or less. If it is controlled in this range, the unevenness in the thickness of the resin layer can be depressed. Preferred inorganic filler materials with a low aspect ratio include glass beads and silica beads.

When a pigment is added as the solid additive (C), the difference in refractive index between the inorganic filler (D) and the cured product of the thermosetting resin (B-2) is preferably 0.1 or less. As the difference in refractive index decreases, the coat layer increases in transparent to ensure more significant development of the coloring effect of the pigment.

The thickness of the porous sheet-like base material having continuous holes (E) and/or the porous sheet-like base material having continuous holes (E') is preferably 1 μm or more and 100 μm or less, more preferably 1 μm or more and 50 μm or less, and most preferably 1 μm or more and 30 μm or less. A smaller thickness is preferable because its contribution to weight increase decreases.

The thickness of the porous sheet-like base material having continuous holes (E) and/or the porous sheet-like base material having continuous holes (E') can be measured according to JIS L 1913 (2010) using an automatic compression elasticity-thickness tester manufactured by Daiei Kagaku Seiki Mfg. Co., Ltd. and the like.

Useful materials for the porous sheet-like base material having continuous holes (E) and/or porous sheet-like base material having continuous holes (E') include, for example, nonwoven fabric, woven fabric, and porous film. There are no specific limitations on the fiber used to form the nonwoven fabric or woven fabric and useful materials include, for example, organic fibers such as polyester, nylon, polyphenylene sulfide, polypropylene, and aramid, inorganic fibers such as carbon fiber, glass fiber, and ceramic, and metallic fibers such as stainless steel, aluminum, and copper.

Useful porous film materials include, for example, porous polypropylene sheets, porous polyethylene sheets, melamine foam, and urethane foam. In particular, porous polypropylene sheets and melamine foam are preferred from the viewpoint of heat resistance.

A prepreg is composed mainly of a reinforcement fiber (A) and a thermosetting resin (B-1). There are no specific limitations on the reinforcement fiber and examples include organic fiber, glass fiber, and carbon fiber, of which carbon fiber is preferred from the viewpoint of mechanical characteristics.

There are no specific limitations on the type of prepreg and good examples include cloth prepreg, unidirectional continuous fiber prepreg, SMC, and other types of discontinuous fiber mats. When cloth prepreg is adopted, the cloth prepreg to be used preferably has an aperture of 30 μm or less to prevent the solid additive (C) from infiltrating into the prepreg layer (I). Unidirectional continuous fiber prepreg and SMC are weak in binding force among fibers and accordingly the fibers can drift easily in the thickness direction of the laminated product, ensuring strong effect in arresting the drifting of the reinforcement fiber.

A molded article produced by curing a prepreg containing a reinforcement fiber (A) and a thermosetting resin (B-1) preferably has a luminosity L* of 50 or less according to the CIELab color space. A combined use of a prepreg in the above luminosity range and a pigment having two or more layers with different refractive indices as described above realizes efficient color development of the pigment. The luminosity L* can be measured by, for example, using a MSC-P tester (manufactured by Suga Test Instruments Co., Ltd.).

The thermosetting resin (B-1) contains a thermosetting resin and a curing agent. There are no specific limitations on the thermosetting resin, but examples include epoxy resin, unsaturated polyester, phenol resin, and other appropriate thermosetting resins. These thermosetting resins may be used singly or as a blend thereof. For use as housing for electric and electronic instruments, it is preferable to use a material containing a novolac type epoxy resin because the resulting cured product will have high elastic modulus.

Useful curing agents include, for example, compounds that undergo a stoichiometric reaction such as aliphatic polyamine, aromatic polyamine, dicyandiamide, polycarboxylic acid, polycarboxylic acid hydrazide, acid anhydride, polymercaptan, and polyphenol; and those which act catalytically such as imidazole, Lewis acid complexes, and onium salts. In some cases, a compound that undergoes a stoichiometric reaction may be used in combination with a curing accelerator such as imidazole, Lewis acid complexes, onium salts, urea derivatives, and phosphine. Of these curing agents, preferable ones include organic nitrogen compounds whose molecules have nitrogen-containing groups such as amino group, amide group, imidazole group, urea group, and hydrazide group because the resulting fiber reinforced composite materials will have high heat resistance and good mechanical characteristics. These curing agents may be used singly or as a combination of a plurality thereof.

The thermosetting resin (B-1) may further contains a thermoplastic resin component. The addition of a thermoplastic resin serves to control the tackiness of the prepreg and the flowability of the matrix resin during the heat-curing of the prepreg.

From the viewpoint of handleability and resin flow, thermosetting resin (B-1) preferably has a shear viscosity of 2 to 20 Pa·s, more preferably 3 to 18 Pa·s, at a temperature of 100° C. A shear viscosity in this range serves to depress the resin flow during the molding step and produce a molded article with improved appearance quality and mechanical characteristics. When assuming the adoption of a film formation step by the hot melt method, it will also serve to prevent blurring to ensure the formation of a high quality film. In carrying out a reinforcement fiber impregnation step, it will work to improve the impregnation performance to a high degree. The shear viscosity at a temperature of 100° C. is measured by using a dynamic viscoelasticity measuring machine (ARES-2KFRTN1-FCO-STD, supplied by TA Instruments) along with flat parallel plates with a diameter of 40 mm as measuring jigs. The thermosetting resin (B-1) is set such that the distance between the plates is 1 mm, and the shear viscosity is measured in the twisting mode (measuring frequency 0.5 Hz) at a heating rate of 1.5° C./min a temperature of 40° C. to 140° C.

The thermosetting resin (B-2) contains a thermosetting resin and a curing agent. There are no specific limitations on the thermosetting resin, but examples include epoxy resin, unsaturated polyester, phenol resin, and other appropriate thermosetting resins. These thermosetting resins may be used singly or as a blend thereof. When a solid additive (C) intended for improving design characteristics is adopted, the use of an epoxy resin or unsaturated polyester with high transparency is preferred. For use as housing for electric and electronic instruments, it is preferable to use a material containing a novolac type epoxy resin because the resulting cured product will have high elastic modulus.

Useful curing agents include, for example, compounds that undergo a stoichiometric reaction such as aliphatic polyamine, aromatic polyamine, dicyandiamide, polycarboxylic acid, polycarboxylic acid hydrazide, acid anhydride, polymercaptan, and polyphenol; and those which act catalytically such as imidazole, Lewis acid complexes, and onium salts. In some cases, a compound that undergoes a stoichiometric reaction may be used in combination with a curing accelerator such as imidazole, Lewis acid complexes, onium salts, urea derivatives, and phosphine. Of these curing agents, preferable ones include organic nitrogen compounds whose molecules have nitrogen-containing groups such as amino group, amide group, imidazole group, urea group, and hydrazide group because the resulting fiber reinforced composite materials will have high heat resistance and good mechanical characteristics. These curing agents may be used singly or as a combination of a plurality thereof.

The thermosetting resin (B-2) may further contains a thermoplastic resin component. The blending of a thermoplastic resin serves to control the tackiness of the coat layer and the flowability of the matrix resin during the heat-curing of the preform.

It is preferable for the thermosetting resin (B-2) to have a shear viscosity of 0.5 to 100 Pa·s at 100° C. When it is in the range, processing of the resin into a layer and kneading of a solid additive (C) or inorganic filler (D) can be performed easily to ensure a high handleability. The shear viscosity of the thermosetting resin (B-2) at 100° C. can be measured in the same way as described for the thermosetting resin (B-1).

When a solid additive (C) intended for improving design characteristics is added, it is preferable for the cured product of the thermosetting resin (B-2) to have a total light transmittance of 50% or more. The total light transmittance as referred to here is measured for a plate-like sample with a thickness of 100 μm according to JIS K 7361-1 (1997) using a haze transmissometer (HM-150, manufactured by Manufactured by Murakami Color Research Laboratory Co., Ltd. and the like). A total light transmittance controlled in this range allows the fiber reinforced layer to be visible through the coat layer to ensure design characteristics with deeper colors as compared to simple coating. If the total light transmittance is less than 50%, the pigment may lose its good color and brightness features.

The thermosetting resin (B-1) and the thermosetting resin (B-2) may be the same as or different from each other. It is preferable for the thermosetting resin (B-1) and the thermosetting resin (B-2) to contain the same curing agent because the molding step can be performed at a molding temperature that is suitable for both the thermosetting resin (B-1) and the thermosetting resin (B-2). In another example, the curing rate of the thermosetting resin (B-1) is preferably higher than the curing rate of the thermosetting resin (B-2) because the viscosity increase caused by the curing of the prepreg layer (I) occurs earlier than that of the thermosetting resin (B-2), serving to depress the drifting of the reinforcement fiber into the resin layer (II) during the molding step. The curing rate as referred to here is based on the torque that is determined by taking measurements using a rheometer (RPA2000, manufactured by Alpha Technologies) in the twisting mode (measuring frequency 1.5 Hz) while heating an approximately 5 g uncured resin sample of the thermosetting resin (B-1) or the thermosetting resin (B-2) at a rate of 1.5° C./min. The length of time required to exceed a torque of 0.3 Nm is compared between the two thermosetting resins and either one that requires a shorter time is judged to be faster in curing.

Production of Resin Layer and Resin Base Material

A compound resin to be used to prepare the resin layer (II) can be produced by using an agitator, extruder or the like.

In a resin layer (II) that consists of a thermosetting resin (B-2), solid additive (C), and inorganic filler (D), it is appropriate for the inorganic filler (D) to account for 1% to 50%, preferably 2% to 30%, more preferably 10% to 30%, by volume of the compound resin, that is, the resin dominantly constituting the resin layer (II). A volume fraction of the inorganic filler (D) controlled in this range serves to depress the thickness decrease of the resin layer (II) during the molding step. If the volume fraction is less than 1%, the effect of depressing the drifting of the reinforcement fiber into the resin layer tends to decrease, possibly leading to a reduction in the effect of preventing the thickness decrease of the resin layer. If the volume fraction is more than 50%, the resin viscosity will increase, possibly making it difficult to knead the inorganic filler (D) uniformly.

The volume fraction of the solid additive (C) in the compound resin is preferably 0.01% to 20% from the viewpoint of development of functions. If the volume fraction is less than 0.01%, the addition of the solid additive (C) will possibly not work sufficiently to develop functions, whereas if it is added to more than 20%, it may not contribute significantly to develop surface functions.

In a resin layer (II) that consists of a thermosetting resin (B-2), a solid additive (C), and porous sheet-like base material having continuous holes (E), the hole diameter Le of the porous sheet-like base material having continuous holes (E) meets the relation of Le<Lc where Lc is the average of the longest diameters across the primary particles of the solid additive (C). A hole diameter Le that meets this requirement helps to depress the passage of the solid additive (C) through the porous sheet-like base material having continuous holes (E). Localized existence of the solid additive (C) near the surface of the coat layer, i.e., the cured resin layer (II') produced by the curing step, of a molded article is preferable because it serves for effective performance of functions.

A prepared compound resin can be processed into a layer as described below. A resin layer (II) can be produced by pressing a prepared compound resin by a pressing machine or the like or spreading it over, for example, a sheet of release paper or polyethylene film to a predetermined thickness.

In a resin layer (II) that consists of a thermosetting resin (B-2), a solid additive (C), and a porous sheet-like base material having continuous holes (E) such a resin layer (II) can be produced by kneading a thermosetting resin (B-2) and a solid additive (C) in the same way as described above to provide a compound resin and then impregnating the porous sheet-like base material (E) with the compound resin by the method described later.

The preform can be produced by laminating the resulting resin layer (II) to the surface of a prepreg. Otherwise, the resin layer (II) may be transferred to the surface of a prepreg laminated in advance to a predetermined thickness.

Other methods useful for preparing a preform having a resin layer (II) on the surface include the hot melt technique described below.

Preparation of a preform using the hot melt technique can be carried out as described below. First, the reinforcement fiber (A) is impregnated with the thermosetting resin (B-1) from either surface or from both surfaces by heating and pressing. Subsequently, a preform can be produced by attaching a resin layer (II).

When the compound resin is low in viscosity and difficult to process into a layer, a preform can be produced by, for example, placing a prepreg in a mold and pouring a compound resin onto it. In the case of a resin layer (II) that consists of a thermosetting resin (B-2), a solid additive (C), and a porous sheet-like base material having continuous holes (E), a preform can be produced by preparing a prepreg with a porous sheet-like base material having continuous holes (E) attached to the surface, placing it in a mold, and pouring a compound resin consisting of a thermosetting resin (B-2) and a solid additive (C) onto the surface where the porous sheet-like base material having continuous holes (E) is attached.

The volume fraction of the solid additive (C) in the resin layer (II) thus formed is equal to the volume fraction of the solid additive (C) in the aforementioned compound resin. In the case where the resin layer (II) contains a thermosetting resin (B-2), a solid additive (C), and inorganic filler (D), the volume fraction of the inorganic filler (D) is equal to the volume fraction of the inorganic filler (D) in the aforementioned compound resin.

Formation of a resin layer (II) and subsequent production of a resin base material can be carried out as described below.

A resin base material consisting of a thermosetting resin (B-2), a solid additive (C), and inorganic filler (D) can be produced by preparing a compound resin in advance according to the aforementioned method and then spreading the compound resin over, for example, a sheet of release paper or polyethylene film.

A resin base material that consists of a thermosetting resin (B-2), a solid additive (C), and a porous sheet-like base material having continuous holes (E) can be obtained by kneading a thermosetting resin (B-2) and a solid additive (C) in the same way as described above to provide a compound resin in advance and then applying the compound resin over a porous sheet-like base material having continuous holes (E). To prevent the resin from sticking to surrounding parts, it is preferable to spread the porous sheet-like base material having continuous holes over, for example, a sheet of release paper or polyethylene film before performing the application step. If it is difficult to impregnate the porous sheet-like base material having continuous holes with the compound resin, the application of the compound resin may be followed by heating and pressing using a nip roll or double belt press to promote the impregnation.

It is more preferable to apply the compound resin to only one surface of the porous sheet-like base material having continuous holes (E). If the compound resin is applied to both surfaces, the solid additive (C) present near the surface where the prepreg layer (I) is laminated cannot be localized near the surface of the resulting molded article, resulting in weakening of the effect of developing functions. In this case, lamination is performed such that the surface of the resin layer (II) where the porous sheet-like base material having continuous holes (E) is localized densely faces the prepreg layer (I).

Production of Preform

The preform includes a prepreg provided with a surface layer that contains a solid additive. If such a preform is molded alone or after attaching it on the surface of a prepreg, a molded article of a fiber reinforced composite material having a coat layer can be produced in a more simple manner as compared to when a molded article is produced first from a prepreg followed by forming a coat layer by coating.

Since the preform is a laminate of a prepreg layer (I) containing a reinforcement fiber (A) and a thermosetting resin (B-1), a resin layer (II) containing a thermosetting resin (B-2) and a solid additive (C), and a layer (III) of a porous sheet-like base material having continuous holes (E') that is interposed therebetween, the hole diameter Le' of the porous sheet-like base material having continuous holes (E') meets the relation of Le'<Lc where Lc is the average of the longest diameters across the primary particles of the solid additive (C). A hole diameter Le' that meets this requirement helps to depress the passage of the solid additive (C) through the porous sheet-like base material having continuous holes (E'). In particular, the localized existence of the solid additive (C) near the surface of the coat layer is preferable to serve for effective performance of functions.

The hole diameter Le of the porous sheet-like base material having continuous holes (E') is a peak top value in the distribution obtained by the mercury intrusion method. On the other hand, the average of the longest diameters Lc across the primary particles of the solid additive (C) is determined by dispersing the solid additive (C) in water or an organic solvent and casting it on a slide glass to prepare a sample, which is observed by a microscope. The longest diameter across a particle of the solid additive (C) is measured at 100 points and the average is calculated.

The thermosetting resin (B-1) and the thermosetting resin (B-2) may be the same as or different from each other. It is preferable for the thermosetting resin (B-1) and the thermosetting resin (B-2) to contain the same curing agent because the molding step can be performed at a molding temperature that is suitable for both the thermosetting resin (B-1) and the thermosetting resin (B-2).

Examples of Industrial Application

The fiber-reinforced composite material thus produced is highly useful because it is so high in design property, weather resistance, and fire retardance that it can be applied widely to automobile members, sports goods, electric appliances, and computer members such as IC trays and laptop computer housings.

EXAMPLES

Our methods, materials and preforms are described more specifically below with reference to Examples. Described below are the prepreg, solid additive (C), matrix resin of the resin layer (II), inorganic filler (D), and porous sheet-like base material having continuous holes (D) used in Examples. However, note that this disclosure is not limited to these examples.

Materials

Prepreg

Prepreg A: unidirectional continuous thermosetting fiber prepreg (product number: 3252S-12, unidirectional grade of epoxy resin impregnated carbon fiber T700SC-12000, manufactured by Toray Industries, Inc.)

Prepreg B: thermosetting cloth prepreg (product number F6347B-05P, twill weave grade of epoxy resin impregnated carbon fiber T300-3000, manufactured by Toray Industries, Inc.)

Prepreg C: thermosetting cloth prepreg (product number F6343B-05P, plain weave grade of epoxy resin impregnated carbon fiber T300-3000, manufactured by Toray Industries, Inc.)

Prepreg D: thermosetting SMC

Unsaturated polyester resin liquid (solution of isophthalic acid based unsaturated polyester resin with a number average molecular weight of about 2,000 dissolved in styrene, styrene concentration 40 mass %) 70 parts by mass Polystyrene resin liquid (solution of polystyrene resin with a weight average molecular weight of about 95,000 dissolved in styrene, styrene concentration 65 mass %) 30 parts by mass Polymerization initiator (tertiary-Butyl peroxybenzoate) 1 part by mass Viscosity improver (magnesium oxide powder with an average particle diameter of about 3 μm, Kyowamag 150, manufactured by Kyowa Chemical Industry Co., Ltd.) 1 part by mass Internal mold releasing agent (zinc stearate, manufactured by Sakai Chemical Industry Co., Ltd.) 3 parts by mass Glass fiber (roving, ER4630LBD166W, cut to a length of 25 mm, manufactured by Asahi Fiber Glass Co., Ltd.) 25 parts by mass All blend components listed above excluding the glass fiber are mixed and kneaded well, and the glass fiber was impregnated with the kneaded mixture prepared above in a SMC production apparatus, followed by ageing at 40° C. for 24 hours to provide a sheet-like base material with a thickness of about 2 mm.

Solid Additive (C)

Solid additive A: alumina flake type effect pigment (trade name Xirallic T60-23 WNT Galaxy Blue, manufactured by MERCK, titanium oxide clad alumina flake)

Solid additive B: flake type glass effect pigment (trade name Miraval 5424 Magic Blue, manufactured by MERCK, titanium oxide clad flake type glass)

Thermosetting Resin (B-2)

Thermosetting Resin A

Base Resin:

Liquid bisphenol A type epoxy resin (jER (registered trademark) 828, manufactured by Mitsubishi Chemical Corporation) 50 parts by mass Solid bisphenol A type epoxy resin (jER (registered trademark) 1007, manufactured by Mitsubishi Chemical Corporation) 30 parts by mass Dicyclopentadiene-type skelton based epoxy resin (Epicron (registered trademark) HP7200H, DIC) 20 parts by mass Curing Agent:
  dicyandiamide (Dicy7, supplied by Mitsubishi Chemical Corporation) 4 parts by mass Urea compound (trade name DCMU99, manufactured by Hodogaya Chemical Co., Ltd.) 3 parts by mass
Thermoplastic Resin:
  Vinylec (registered trademark) K (polyvinyl formal, manufactured by Chisso Corporation) 2 parts by mass
Thermosetting Resin B
Base Resin:
  Polyfunctional epoxy resin (Araldite (registered trademark) MY9655, manufactured by Huntsman) 60 parts by mass
  Liquid bisphenol A type epoxy resin (EPON (registered trademark) 825, manufactured by Hexion) 40 parts by mass
Curing Agent:
  Diaminodiphenyl sulfone (Aradur (registered trademark) 9664-1, manufactured by Huntsman) 45 parts by mass
Thermoplastic Resin:
  Polyether sulfone (Sumikaexcel PES 5003P, manufactured by Sumitomo Chemical Co., Ltd.) 16 parts by mass
Inorganic Filler (D)
Inorganic filler A: Soda lime glass beads (grade: UB-01L, manufactured by Unitika Ltd., average shortest diameter $Lc_1$ across primary particle 25 µm, refractive index 1.51)
Inorganic filler B: Soda lime glass beads (grade: UBS-24L, manufactured by Unitika Ltd., average shortest diameter $Lc_1$ across primary particle 50 µm, refractive index 1.51)
Inorganic filler C: Soda lime glass beads (grade: UB-67L, manufactured by Unitika Ltd., average shortest diameter $Lc_1$ across primary particle 80 µm, refractive index 1.51)
Inorganic filler D: Titanium based barium glass beads (grade: UB-23NH, manufactured by Unitika Ltd., average shortest diameter $Lc_1$ across primary particle 50 µm, refractive index 1.90)
Inorganic filler E: Borosilicate glass beads (grade: UB-0010E, manufactured by Unitika Ltd., average shortest diameter $Lc_1$ across primary particle 5 µm, refractive index 1.49)
Porous Sheet-Like Base Materials (E) and (E')
Porous sheet-like base material A: A nonwoven fabric type base material with a width of 1,000 mm was prepared by the blow method from pellets of CM4000 (terpolymerized polyamide resin (polyamide 6/66/610, melting point 150° C.), manufactured by Toray Industries, Inc. The nonwoven fabric type base material had a weight per unit area of 30 g/m² and a film thickness of 45 µm.
Porous sheet-like base material B: A nonwoven fabric type base material with a width of 1,000 mm was prepared by the blow method from pellets of polypropylene resin (melting point 150° C., melt flow rate 1,000 g/10 min at 230° C. under 2.16 kg load), manufactured by SunAllomer Ltd. The nonwoven fabric type base material had a weight per unit area of 12 g/m² and a film thickness of 37 µm.
Porous sheet-like base material C: A nonwoven PBT fabric (trade name Delpore, product number DP3002-40B, manufactured by Sansho Co., Ltd., film thickness 51 µm) Porous sheet-like base material D: Porous PET film (PET film (trade name S10 Lumirror #38, manufactured by Toray Industries, Inc.) perforated with heated needle, film thickness 38 µm)
Production Method
Preparation of Thermosetting Resin (B-2)
Thermosetting Resin A:
  The aforementioned base resin and thermoplastic resin were put in a kneading apparatus, heated to a temperature of 160° C., and kneaded for 30 minutes while heating at 160° C. Then, while continuing the kneading, the temperature was lowered down to 55° C. to 65° C., and a curing agent was added, followed by stirring for 30 minutes to provide thermosetting resin A.
Thermosetting Resin B:
  The aforementioned base resin and thermoplastic resin were put in a kneading apparatus, heated to a temperature of 160° C., and kneaded for 30 minutes while heating at 160° C. Then, while continuing the kneading, the temperature was lowered down to 70° C. to 80° C., and a curing agent was added, followed by stirring for 30 minutes to provide thermosetting resin B.

Preparation of Compound Resin

Compound Resin A (Preparation Example 1)

First, 1 part by mass of solid additive A and 2.5 parts by mass of inorganic filler B were added to 50 parts by mass of thermosetting resin A prepared above and heated at 60° C. for 2 hours by a hot air drier to adjust the viscosity of thermosetting resin A to a region suitable for kneading. This mixture was kneaded in a rotation and revolution type vacuum mixer (manufactured by Thinky Corporation) at 1,600 rpm for 10 minutes to provide compound resin A.

Compound Resin B (Preparation Example 2)

Except for using 7.5 parts by mass of inorganic filler A, the same procedure as in preparation example 1 was carried out to provide compound resin B.

Compound Resin C (Preparation Example 3)

Except for using 28 parts by mass of inorganic filler B, the same procedure as in preparation example 1 was carried out to provide compound resin C.

Compound Resin D (Preparation Example 4)

Except for using 1 part by mass of solid additive B and 25 parts by mass of inorganic filler C, the same procedure as in preparation example 1 was carried out to provide compound resin D.

Compound Resin E (Preparation Example 5)

Except for using 7.5 parts by mass of inorganic filler B, compound resin E was prepared under the same conditions as in preparation example 1.

Compound Resin F (Preparation Example 6)

Except for using 28 parts by mass of inorganic filler D, the same procedure as in preparation example 1 was carried out to provide compound resin F.

Compound Resin G (Preparation Example 7)

Except for using 16 parts by mass of inorganic filler E, the same procedure as in preparation example 1 was carried out to provide compound resin G.

Compound Resin H (Preparation Example 8)

Except for using 0.5 part by mass of inorganic filler B, the same procedure as in preparation example 1 was carried out to provide compound resin H.

Compound Resin I (Preparation Example 9)

Except for not using an inorganic filler, the same procedure as in preparation example 1 was carried out to provide compound resin I.

Compound Resin J (Preparation Example 10)

First, 1 part by mass of solid additive A and 2.5 parts by mass of inorganic filler B were added to 50 parts by mass of thermosetting resin B prepared above and heated at 80° C. for 2 hours by a hot air drier to adjust the viscosity of thermosetting resin A to a region suitable for kneading. This mixture was kneaded in a rotation and revolution type vacuum mixer (manufactured by Thinky Corporation) at 1,600 rpm for 10 minutes to provide compound resin J.

Compound Resin K (Preparation Example 11)

First, 1 part by mass of solid additive B was added to 50 parts by mass of thermosetting resin A prepared above and heated at 60° C. for 2 hours by a hot air drier to adjust the viscosity of thermosetting resin A to a region suitable for kneading. This mixture was kneaded in a rotation and revolution type vacuum mixer (manufactured by Thinky Corporation) at 1,600 rpm for 10 minutes to provide compound resin K.

Compound Resin L (Preparation Example 12)

Except for using 1 part by mass of solid additive A, compound resin L was prepared under the same conditions as in preparation example 11.

Production of Resin Layer

Resin Layers A to J (Production Examples 1 to 10)

Resin layers A to J were prepared by preheating 5 g of each of compound resins A to J at 70° C. for 7 minutes in a pressing machine and pressing it at 0.1 MPa for 3 minutes. The thickness was adjusted using a spacer with a thickness of 100

Resin Layers K and L (Production Examples 11 and 12)

Resin layer K and resin layer L were prepared by preheating 5 g of compound resin K or L at 70° C. for 7 minutes in a pressing machine and pressing them at 0.1 MPa for 3 minutes. The thickness was adjusted using a spacer with a thickness of 100

Resin Layer M (Production Example 13)

Resin layer M was prepared by stacking resin layer K on porous sheet-like base material A, preheating the laminate at 70° C. for 7 minutes in a pressing machine and pressing it at 0.1 MPa for 3 minutes. The thickness was adjusted using a spacer with a thickness of 100

Resin Layer N (Production Example 14)

Resin layer L was stacked on porous sheet-like base material B and pressed under the same conditions as in production example 13 to provide resin layer N.

Resin Layer O (Production Example 15)

Resin layer K was stacked on porous sheet-like base material B and pressed under the same conditions as in production example 13 to provide resin layer O.

Resin Layer P (Production Example 16)

Resin layer K was stacked on porous sheet-like base material C and pressed under the same conditions as in production example 13 to provide resin layer P.

Resin Layer Q (Production Example 17)

Resin layer A was stacked on porous sheet-like base material D and press under the same conditions as in production example 13 to provide resin layer Q.

Resin Layer R (Production Example 18)

Resin layer B was stacked on porous sheet-like base material D and press under the same conditions as in production example 13 to provide resin layer R.

Evaluation Methods

Average of Shortest Diameters Across Primary Particles of Solid Additive (C) and Particles of Inorganic Filler (D)

The solid additive (C) or the inorganic filler (D) was dispersed in water and cast onto a slide glass to prepare a sample, which was observed by a laser microscope (VK-9500, manufactured by Keyence). The difference in focal depth between the top face of the slide glass and the top face of the solid additive (C) or the inorganic filler (D) was measured at 100 points and the average of the measurements was calculated. Results are given in Table 1.

Average of Longest Diameters Across Primary Particles of Solid Additive (C)

The solid additive (C) was dispersed in water and cast onto a slide glass to prepare a sample, which was observed by a laser microscope (VK-9500, manufactured by Keyence). The longest diameter of an independent particle of the solid additive (C) was measured at 100 points and the average of the measurements was calculated. Results are given in Tables 1, 2, and 3. Average of longest diameters across dispersed particles of solid additive (C)

A molded article was cut in the thickness direction, placed in a mold with the cross section facing down, and fixed using epoxy resin. The face of the resulting block facing to the cross section of the molded article was polished to prepare a sample for observation. The polished face was observed by a laser microscope (VK-9500, manufactured by Keyence) and the longest diameter across a dispersed particle was measured at 100 points, followed by calculating the average of the measurements. Results are given in Tables 1, 2, and 3.

Measurement of Aspect Ratio

The solid additive (C) was dispersed in water and cast onto a slide glass to prepare a sample, which was observed by a laser microscope (VK-9500, manufactured by Keyence). The longest size across an arbitrary particle of the solid additive (C) was measured and adopted as the longest diameter. Subsequently, the same sample of the solid additive (C) was observed to measure the difference in focal depth between the top face of the slide glass and the top face of the solid additive (C) and adopted as the shortest diameter. The measured longest diameter was divided by the shortest diameter to calculate the quotient. Similar measurements were taken from a total of 100 samples and their average was adopted as aspect ratio.

Thickness of Porous Sheet-Like Base Materials (E) and (E')

The thickness of a porous sheet-like base material was measured according to JIS L 1913 (2010) using an automatic compression elasticity-thickness tester (CHE-400, manufactured by Daiei Kagaku Seiki Mfg. Co., Ltd.).

Hole Diameters Le and Le' of Porous Sheet-Like Base Materials (E) and (E')

Autopore IV9510 manufactured by Micromeritics was used for measurement by the mercury intrusion method. The mercury intrusion pressure was 4 kPa to 400 MPa; the measuring hole diameter was 3 nm to 400 μm; the measuring mode was "pressure increase"; the measuring cell volume was 5 cm$^3$; and the surface of tension of mercury was assumed to be 484 dyn/cm. To prepare a sample, a square with sides of several centimeters was cut out of a porous sheet-like base material (E) or (E') and weighed, and after measuring the size accurately, it was enclosed in a specimen container made of glass.

Curing Rate of Thermosetting Resin

The torque to serve as index was determined by taking measurements using a rheometer (RPA2000, manufactured by Alpha Technologies) in the twisting mode (measuring frequency 1.5 Hz) while heating an approximately 5 g uncured resin sample of a thermosetting resin at a rate of 1.5° C./min. The length of time required to exceed a torque of 0.3 Nm was compared between a pair of thermosetting resins and either one that requires a shorter time was judged to be faster in curing. The curing rate of a thermosetting resin in a prepreg was determined as described below.

A sample of thermosetting resin C, which was used as the matrix resin of prepreg A, was taken by scratching prepreg A by moving a spatula in the fiber direction. The curing rates of thermosetting resin C thus sampled and thermosetting resin B prepared by kneading above were measured by the evaluation method described above and results showed that thermosetting resin C was cured faster than thermosetting resin B.

Average Thickness of Coat Layer after Molding Step

A molded article was cut in the thickness direction, placed in a mold with the cross section facing down, and fixed using epoxy resin. The face of the resulting embedded block facing to the cross section of the molded article was polished to prepare a sample for observation. The polished face was observed by a laser microscope (VK-9500, manufactured by Keyence) and the distance between the surface of the molded article and the reinforcement fiber was measured at 20 points, followed by calculating the average of the measurements. In the case of observation of a cured cloth prepreg, a strand in which the fibers stand perpendicular to the surface under observation was selected, and after dividing the strand into three parts, the central region was observed.

Proportion of Solid Additive (C) in Coat Layer after Curing Step

As in Examples and Comparative examples described later, a fiber reinforced composite material was prepared and its cross section was polished and photographed by a laser microscope (VK-9500, manufactured by Keyence) at a magnification of 1,000 times. In this photograph of the cross section, a line parallel to the surface of the fiber reinforced composite material was drawn at a depth corresponding to the thickness of the coat layer after the molding step determined previously. The ratio between the total cross section of the solid additive (C) and the cross section of the solid additive (C) present between the fiber reinforced composite material and the aforementioned line was determined by an image analyzer. In the case of observation of a cured cloth prepreg, a strand in which the fibers stand perpendicular to the surface under observation was selected, and after dividing the strand into three parts, the central region was observed. Results are given in Tables 1, 2, and 3.

Degree of Localization of Solid Additive (C) in Resin Layer (II)

For resin layers K to R prepared as described above, a sample taken was sandwiched between two smooth polytetrafluoroethylene resin plates and brought into close contact, and then gradual heating was continued for 7 days up to 150° C. to ensure gelation and curing, thus producing a plate-like cured resin. After the completion of curing, the cured plate was cut in the direction perpendicular to the contact interface, and the cross section was polished and photographed by a laser microscope (VK-9500, manufactured by Keyence) at a magnification of 400. From this photograph of the cross section, the ratio between the total cross section S1 of the solid additive (C) and the cross section S2 of the solid additive (C) present between the porous sheet-like base material having continuous holes (E) and the surface of the cured resin in the a-side (the side in contact with the resin film) was determined by an image analyzer. Results are given in Table 3.

Distance Between Porous Sheet-Like Base Material and Reinforcement Fiber in Fiber Reinforced Composite Material after Molding Step As in Examples and Comparative examples described later, a fiber reinforced composite material was prepared and its cross section was polished and photographed by a laser microscope (VK-9500, manufactured by Keyence) at a magnification of 1,000 times. In this photograph of the cross section, the region perpendicular to the fiber was observed to measure the distance between the porous sheet-like base material (E) and the reinforcement fiber (A) at 20 points and the average of the measures was calculated. Results are given in Tables 2 and 3. In the case of observation of a cured cloth prepreg, a strand in which the fibers stand perpendicular to the surface under observation was selected, and after dividing the strand into three parts, the central region was observed.

Measurement of Refractive Index

For inorganic fillers A to E, the refractive index was measured by the Becke line method specified in JIS K 7142 (1996).

In addition, thermosetting resin A prepared as described above was injected into an appropriate mold with a gap of 1 mm and heated in a hot air oven from room temperature to a temperature of 120° C. at a heating rate of 1.5° C. per minute and cured for one hour at the temperature of 120° C. A piece with a length 20 mm and a width of 8 mm was cut out of the resulting cured product and its refractive index was measured using an Abbe refractometer as described in JIS K 7142 (1996). The refractive index of thermosetting resin A obtained above was 1.59.

Thermosetting resin B prepared as described above was injected into an appropriate mold with a gap of 1 mm and heated in a hot air oven from room temperature to a temperature of 170° C. at a heating rate of 1.5° C. per minute and cured for two hours at the temperature of 170° C. A piece with a length 20 mm and a width of 8 mm was cut out of the resulting cured product and its refractive index was measured using an Abbe refractometer as described in JIS K 7142 (1996). The refractive index of thermosetting resin B obtained above was 1.61.

Measurement of Luminosity L*

A specimen of fiber reinforced composite material for measuring the luminosity L* was prepared, and its spectral reflectance was measured using a multi-illuminant colorimeter (MSC-P, manufactured by Suga Test Instruments Co., Ltd.) in the wavelength range of 380 to 780 nm under the conditions of using the reflection light mode, C illuminant, 2° field of view, 8° incidence, and exclusion of specular reflection, and the luminosity L* was determined by calculation.

Measurement of Aperture of Cloth Prepreg

Prepregs B and C were observed by a digital microscope (VHX-500, manufactured by Keyence) and photographs were taken at a magnification of 200 times. The length of the diagonal across an aperture present at the intersection of CF strands was measured at 20 points and the average of the measurements was adopted as the aperture. Results are given in Table 1.

Measurement of Total Light Transmittance

Thermosetting resin A prepared as described above was preheated in a pressing machine at 150° C. for 5 minutes and then pressed at 0.1 MPa for 30 minutes to ensure curing. The thickness was adjusted using a spacer with a thickness of 100 The resulting cured product was observed using beams in the visible light wavelength region (380 to 780 nm) and the total light transmittance was measured according to JIS K 7361-1 (1997) using a haze transmissometer (HM-150, manufactured by Murakami Color Research Laboratory Co., Ltd.). The total light transmittance was 89%.

In addition, thermosetting resin B prepared as described above was preheated in a pressing machine at 180° C. for 5 minutes and then pressed at 0.1 MPa for 1 hour to ensure curing. The thickness was adjusted using a spacer with a thickness of 100 The resulting cured product was observed using beams in the visible light wavelength region (380 to 780 nm) and the total light transmittance was measured according to JIS K 7361-1 (1997) using a haze transmissometer (HM-150, manufactured by Murakami Color Research Laboratory Co., Ltd.). The total light transmittance was 87%.

Appearance Evaluation A of Fiber Reinforced Composite Material

Plies of prepreg A were stacked to form a structure of [0/90/0/90/0] where the fiber direction was 0°. This prepreg stack was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. Resin layer I was stacked on the resulting fiber reinforced composite material. This laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the resin layer to provide a fiber reinforced composite material having a coat layer on the surface. Using the resulting fiber reinforced composite material as reference, fiber reinforced composite materials prepared in Examples and Comparative examples described later were examined and the degree of opaque in each coat layer was evaluated based on visual observation. A specimen was ranked as A when it was comparable to the reference while it was ranked as C when it was opaquer than the reference. Results are given in Table 1.

Appearance Evaluation B of Fiber Reinforced Composite Material

Plies of prepreg A were stacked to form a structure of [0/90/0/90/0] where the fiber direction was 0°. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. Resin layer K was stacked on the resulting fiber reinforced composite material. This laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the surface layer to provide a molded article of the fiber reinforced composite material having a coat layer on the surface. Using the resulting molded article of fiber reinforced composite material as reference, the molded articles of fiber reinforced composite materials prepared in Examples and Comparative examples described later were examined and the degree of color development in the coat layer of each molded article of fiber reinforced composite material was evaluated based on visual observation. A specimen is ranked as A when it is comparable to the reference, ranked as B when color development was recognized though darker than the reference, and ranked as C when color development was not recognized. Results are given in Tables 2 and 3.

Example 1

Plies of prepreg A were stacked to form a structure of [0/90/0/90/0] where the fiber direction was 0°. In addition, resin layer A was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Examples 2 to 8

Except for using any of resin layers B to H for lamination, the same procedure as in Example 1 was carried out to provide a fiber reinforced composite material having a coat layer on the surface.

Example 9

Plies of prepreg A were stacked to form a structure of [0/90/0/90/0] where the fiber direction was 0°. In addition, resin layer J was stacked on top of it to prepare a preform. The resulting preform was preheated in a pressing machine at 70° C. for 7 minutes and then pressed at 0.4 MPa while at the same time heating it to 180° C. at a heating rate of 5° C./min. After reaching 180° C., the pressure and temperature were maintained for 90 minutes to provide a fiber reinforced composite material having a coat layer on the surface.

Example 10

Four plies of prepreg B were stacked on one another. In addition, resin layer D was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Example 11

Except for using Prepreg C, the same procedure as in Example 10 was carried out to provide a fiber reinforced composite material having a coat layer on the surface.

Example 12

Two plies of prepreg D were stacked on one another. In addition, resin layer B was stacked on top of it to prepare a preform. The resulting preform was placed on a die heated at 145° C. and, after closing the die, it was pressed at 9.8 MPa under the temperature condition at 145° C. for 30 minutes to provide a fiber reinforced composite material having a coat layer on the surface.

Example 13

Plies of prepreg A were stacked to form a structure of [0/90/0/90/0] where the fiber direction was 0°. In addition, porous sheet-like base material A was stacked in contact with the prepreg and then resin layer K was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Example 14

Except for using porous sheet-like base material B and resin layer L for lamination, the same procedure as in Example 13 was carried out to provide a fiber reinforced composite material having a coat layer on the surface.

Example 15

Except for using porous sheet-like base material B for lamination, the same procedure as in Example 13 was carried out to provide a fiber reinforced composite material having a coat layer on the surface.

Example 16

Four plies of prepreg B were stacked on one another. In addition, porous sheet-like base material B was stacked in contact with the prepreg and then resin layer K was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Example 17

Except for using porous sheet-like base material C for lamination, the same procedure as in Example 13 was carried out to provide a fiber reinforced composite material having a coat layer on the surface.

Example 18

Two plies of prepreg C were stacked on one another. In addition, porous sheet-like base material A was stacked in contact with the prepreg and then resin layer K was stacked on top of it to prepare a preform. The resulting preform was placed on a die heated at 145° C. and, after closing the die, it was pressed at 9.8 MPa under the temperature condition at 145° C. for 30 minutes to provide a fiber reinforced composite material having a coat layer on the surface.

Example 19

Except for using porous sheet-like base material D for lamination, the same procedure as in Example 16 was carried out to provide a fiber reinforced composite material having a coat layer on the surface.

Example 20

Plies of prepreg A were stacked to form a structure of [0/90/0/90/0] where the fiber direction was 0°. In addition, resin layer M was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Example 21

Except for using resin layer N for lamination, the same procedure as in Example 20 was carried out to provide a fiber reinforced composite material having a coat layer on the surface.

Example 22

Except for using resin layer O for lamination, the same procedure as in Example 20 was carried out to provide a fiber reinforced composite material having a coat layer on the surface.

Example 23

Four plies of prepreg B were stacked on one another. In addition, resin layer N was stacked on top of it to prepare a preform. The resulting preform was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material having a coat layer on the surface.

Example 24

Except for using resin layer P for lamination, the same procedure as in Example 20 was carried out to provide a fiber reinforced composite material having a coat layer on the surface.

Example 25

Except for using resin layer Q for lamination, the same procedure as in Example 20 was carried out to provide a fiber reinforced composite material having a coat layer on the surface.

Example 26

Except for using resin layer R for lamination, the same procedure as in Example 23 was carried out to provide a fiber reinforced composite material having a coat layer on the surface.

Example 27

Two plies of prepreg C were stacked on one another. In addition, resin layer M was stacked on top of it to prepare a preform. The resulting preform was placed on a die heated at 145° C. and, after closing the die, it was pressed at 9.8 MPa under the temperature condition at 145° C. for 30 minutes to provide a fiber reinforced composite material having a coat layer on the surface.

Comparative Example 1

Except for using resin layer I for lamination, the same procedure as in Example 1 was carried out to provide a fiber reinforced composite material having a coat layer on the surface.

Comparative Example 2

Plies of prepreg A were stacked to form a structure of [0/90/0/90/0] where the fiber direction was 0°. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. Resin layer D was stacked on the resulting fiber reinforced composite material. This laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the resin layer to provide a fiber reinforced composite material having a coat layer on the surface.

Comparative Example 3

Plies of prepreg A were stacked to form a structure of [0/90/0/90/0] where the fiber direction was 0°. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. Porous sheet-like base material A was stacked in contact with the resulting fiber reinforced composite material and then resin layer K was stacked on top of it. This laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the surface layer to provide a fiber reinforced composite material having a coat layer on the surface.

Comparative Example 4

Except for not using a porous sheet-like base material for lamination, the same procedure as in Example 14 was carried out to provide a fiber reinforced composite material having a coat layer on the surface.

Comparative Example 5

Plies of prepreg A were stacked to form a structure of [0/90/0/90/0] where the fiber direction was 0°. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. Resin layer M was stacked on the resulting fiber reinforced composite material. This laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the surface layer to provide a fiber reinforced composite material having a coat layer on the surface.

Production Example 1 of Fiber Reinforced Composite Material for Luminosity L* Measurement Plies of prepreg A were stacked to form a structure of [0/90/0/90/0] where the fiber direction was 0°. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to cure the prepreg to provide a fiber reinforced composite material. The luminosity L* of the resulting fiber reinforced composite material was measured as described above and found to be 22.0.

Production Example 2 of Fiber Reinforced Composite Material for Luminosity L* Measurement Four plies of prepreg B were stacked on one another. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material. The luminosity L* of the resulting fiber reinforced composite material was measured as described above and found to be 22.5.

Production Example 3 of Fiber Reinforced Composite Material for Luminosity L* Measurement Four plies of prepreg C were stacked on one another. This prepreg laminate was preheated in a pressing machine at 70° C. for 7 minutes and then pressed at 0.4 MPa while at the same time heating it to 130° C. at a heating rate of 5° C./min. After reaching 130° C., the pressure and temperature were maintained for 90 minutes to provide a fiber reinforced composite material. The luminosity L* of the resulting fiber reinforced composite material was measured as described above and found to be 22.9.

Production Example 4 of Fiber Reinforced Composite Material for Luminosity L* Measurement Two plies of prepreg D were stacked on one another. The resulting prepreg laminate was placed on a die heated at 145° C. and, after closing the die, it was pressed at 9.8 MPa under the temperature condition at 145° C. for 4 minutes to provide a fiber reinforced composite material. The luminosity L* of the resulting fiber reinforced composite material was measured as described above and found to be 91.2.

TABLE 1

|  |  | Example 1 | Example 2 | Example 3 | Example 4 | Example 5 | Example 6 | Example 7 |
|---|---|---|---|---|---|---|---|---|
| Conditions | Prepreg | A | A | A | A | A | A | A |
|  | aperture of cloth prepreg (μm) |  |  |  |  |  |  |  |
|  | solid additive (C) | A | A | A | B | A | A | A |
|  | inorganic filler (D) | B | A | B | C | B | D | E |
|  | average of shortest diameters Lc1 of primary particles of solid additive (C) (μm) | 0.8 | 0.8 | 0.8 | 1.7 | 0.8 | 0.8 | 0.8 |
|  | average of longest diameters Lc of primary particles of solid additive (C) (μm) | 22.5 | 22.5 | 22.5 | 27.1 | 22.5 | 22.5 | 22.5 |
|  | average of longest diameters Lc2 of dispersed particles of solid additive (C) (μm) | 13 | 13 | 13 | 46 | 13 | 13 | 13 |
|  | aspect ratio of solid additive (C) | 18 | 18 | 18 | 24 | 18 | 18 | 18 |
|  | average of shortest diameters Ld1 of inorganic filler (D) (μm) | 50 | 25 | 50 | 80 | 50 | 50 | 5 |
|  | volume fraction of inorganic filler (D) in resin layer (%) | 2.5 | 13 | 22 | 19 | 13 | 13 | 13 |
|  | difference in refractive index between inorganic filler (D) and cured thermosetting resin (B-2) | 0.08 | 0.08 | 0.08 | 0.08 | 0.08 | 0.41 | 0.10 |
| Evaluation | average thickness T of cured coating layer (μm) | 44 | 41 | 70 | 85 | 60 | 60 | 13 |
|  | change in thickness of resin layer caused by curing (%) | 56 | 59 | 30 | 15 | 40 | 40 | 87 |
|  | proportion of solid additive (C) remaining in cured coat layer (%) | 45 | 63 | 53 | 70 | 65 | 65 | 17 |
|  | opaqueness | A | A | A | A | A | C | A |
|  | production time (minutes) | 109 | 109 | 109 | 109 | 109 | 109 | 109 |

|  |  | Example 8 | Example 9 | Example 10 | Example 11 | Example 12 | Comparative Example 1 | Comparative Example 2 |
|---|---|---|---|---|---|---|---|---|
| Conditions | Prepreg | A | A | B | C | D | A | A |
|  | aperture of cloth prepreg (μm) |  |  | 544 | 0 |  |  |  |
|  | solid additive (C) | A | A | B | B | A | A | B |
|  | inorganic filler (D) | B | B | C | C | A | — | C |
|  | average of shortest diameters Lc1 of primary particles of solid additive (C) (μm) | 0.8 | 0.8 | 1.7 | 1.7 | 0.8 | 0.8 | 1.7 |
|  | average of longest diameters Lc of primary particles of solid additive (C) (μm) | 22.5 | 22.5 | 27.1 | 27.1 | 22.5 | 22.5 | 27.1 |
|  | average of longest diameters Lc2 of dispersed particles of solid additive (C) (μm) | 13 | 13 | 46 | 46 | 13 | 13 | 46 |
|  | aspect ratio of solid additive (C) | 18 | 18 | 24 | 24 | 18 | 18 | 24 |
|  | average of shortest diameters Ld1 of inorganic filler (D) (μm) | 50 | 50 | 80 | 80 | 25 |  | 80 |
|  | volume fraction of inorganic filler (D) in resin layer (%) | 0.05 | 2.5 | 19 | 19 | 13 |  | 19 |
|  | difference in refractive index between inorganic filler (D) and cured thermosetting resin (B-2) | 0.08 | 0.10 | 0.08 | 0.08 | 0.08 |  | 0.08 |
| Evaluation | average thickness T of cured coating layer (μm) | 19 | 52 | 88 | 88 | 45 | 8 | 100 |
|  | change in thickness of resin layer caused by curing (%) | 81 | 58 | 12 | 12 | 55 | 92 | 0 |
|  | proportion of solid additive (C) remaining in cured coat layer (%) | 28 | 48 | 15 | 72 | 49 | 10 | 100 |
|  | opaqueness | A | A | A | A | A | A | A |
|  | production time (minutes) | 109 | 119 | 109 | 109 | 109 | 109 | 218 |

A comparison between Examples 1 to 12 and Comparative Example 1 shows that the addition of an inorganic filler (D) to the resin layer (II) depresses the change in thickness of the resin layer (II) caused by curing. Furthermore, the solid additive (C) accounts for a large proportion in the coat layer, suggesting that the solid additive (C) can exhibit its functions without being confined among reinforcement fibers.

In addition, a comparison of Examples 1 to 6 and 9 to 12 with Examples 7 and 8 shows that the effect of reducing the change in thickness of the resin layer (II) caused by curing is noticeable when the average of the shortest diameters Ld1 of the inorganic filler (D) is 20 μm or more and 100 μm or less and the volume fraction of the solid additive (C) in the resin layer (II) is 0.01% to 20%.

A comparison of Examples 1 to 6 and 12 with Examples 7 and 8 shows that the solid additive (C) accounts for a very large proportion in the coat layer and it can exhibit its functions more effectively without being confined among reinforcement fibers when the average of the shortest diameters Ld1 of the inorganic filler (D) is 20 μm or more and 100 μm or less and the volume fraction of the solid additive (C) in the resin layer (II) is 0.01% to 20%.

A comparison of Example 4 with Example 10 shows that when a cloth prepreg which has the smaller aperture is used, the solid additive (C) accounts for a larger proportion in the coat layer.

A comparison of Example 1 with Example 9 shows that when the curing rate of the thermosetting resin (B-2) is lower than that of the thermosetting resin (B-1) in the prepreg layer (I), the change in thickness of the resin layer (II) caused by curing is reduced and the solid additive (C) accounts for such a large proportion in the coat layer that the solid additive (C) can exhibit its functions without being confined among reinforcement fibers.

A comparison of Examples 1 to 5 and Examples 7 to 11 with Example 6 shows that the coat layer was free of opaque and a highly transparent appearance developed when the difference in refractive index between the inorganic filler (D) and the thermosetting resin (B-2) was 0.1 or less.

In Examples 1 to 6 and Examples 9 and 10, the fiber reinforced composite material showed vivid color development and, when seen through the coat layer, had well-balanced visibility and deep-colored design characteristics.

In Examples 1 to 11, the resulting materials had a glittering appearance of blue which is an interference color of the pigment. In Example 12, the resulting material had a glittering appearance, but showed no interference color.

In Comparative Example 2, although the change in thickness of the resin layer caused by molding was small, a long production time was required because the curing step had to be performed twice.

TABLE 2

| | | Example 13 | Example 14 | Example 15 | Example 16 | Example 17 | Example 18 | Example 19 | Comparative Example 3 | Comparative Example 4 |
|---|---|---|---|---|---|---|---|---|---|---|
| Conditions | prepreg | A | A | A | B | A | C | B | A | A |
| | porous sheet like base materials (E) (E') | A | B | B | B | C | A | D | A | — |
| | hole diameters Le, Le' of porous sheet like base materials (E) (E') (μm) | 10 | 1.1 | 1.1 | 1.1 | 3 | 10 | 200 | 10 | — |
| | solid additive (C) | B | A | B | B | B | B | B | B | A |
| | average of longest diameters Lc of primary particles of solid additive (C) (μm) | 27.1 | 22.5 | 27.1 | 27.1 | 27.1 | 27.1 | 27.1 | 27.1 | 22.5 |
| | average of longest diameters Lc2 of dispersed particles of solid additive (C) (μm) | 46 | 13 | 46 | 46 | 46 | 46 | 46 | 46 | 13 |
| Evaluation | average thickness T of cured coat layer (μm) | 72 | 87 | 90 | 92 | 86 | 70 | 126 | 100 | 8 |
| | proportion of solid additive (C) remaining in cured coat layer (%) | 99 | 100 | 100 | 100 | 100 | 98 | 28 | 100 | 10 |
| | Distance between porous sheet like base materials (E) (E') and reinforcement fiber in fiber reinforced composite material after molding (μm) | 5.1 | 5.3 | 5.3 | 3.9 | 4.9 | 5.5 | 5.0 | 2.1 | — |
| | appearance | A | A | A | A | A | A | B | A | C |
| | production time (minutes) | 109 | 109 | 109 | 109 | 109 | 109 | 109 | 218 | 109 |

A comparison of Examples 13 to 18 with Comparative Example 4 shows that the addition of a porous sheet-like base material (E) such that the hole diameter Le of the porous sheet-like base material (E) and the average Lc of the longest diameters across the primary particles of the solid additive (C) has the relation of Le<Lc serves noticeably to reduce the change in thickness of the surface layer caused by curing. Furthermore, we found that the solid additive (C) accounted for a large proportion in the coat layer and can exhibit its functions effectively.

A comparison of Example 16 with Example 19 shows that the addition of a porous sheet-like base material (E) having a hole diameter Le that is larger than the average of the longest diameters Lc across the primary particles of the solid additive (C) results in a decrease in the proportion of the solid additive (C) present in the coat layer and slight deterioration in the development of functions.

In Comparative Example 3, in spite of a large proportion of the solid additive (C) present in the coat layer, a long production time was required because the curing step had to be performed twice.

TABLE 3

| | | Example 20 | Example 21 | Example 22 | Example 23 | Example 24 | Example 25 | Example 26 | Example 27 | Comparative Example 4 | Comparative Example 5 |
|---|---|---|---|---|---|---|---|---|---|---|---|
| Conditions | prepreg | A | A | A | B | A | A | B | C | A | A |
| | porous sheet like base materials (E) (E') | A | B | B | B | C | D | D | A | — | A |

TABLE 3-continued

|  |  | Example 20 | Example 21 | Example 22 | Example 23 | Example 24 | Example 25 | Example 26 | Example 27 | Comparative Example 4 | Comparative Example 5 |
|---|---|---|---|---|---|---|---|---|---|---|---|
|  | hole diameters Le, Le' of porous sheet like base materials (E) (E') (μm) | 10 | 1.1 | 1.1 | 1.1 | 3 | 200 | 200 | 10 | — | 10 |
|  | solid additive (C) | B | A | B | A | B | B | A | B | A | B |
|  | average of longest diameters Lc of primary particles of solid additive (C) (μm) | 27.1 | 22.5 | 27.1 | 22.5 | 27.1 | 27.1 | 22.5 | 27.1 | 22.5 | 27.1 |
|  | average of longest diameters Lc2 of dispersed particles of solid additive (C) (μm) | 46 | 13 | 46 | 13 | 46 | 46 | 13 | 46 | 13 | 46 |
| Evaluation | Degree of localization of solid additive (C) in resin layer (%) | 100 | 100 | 100 | 100 | 100 | 72 | 69 | 100 | — | 100 |
|  | average thickness T of cured coat layer (μm) | 64 | 79 | 83 | 80 | 74 | 78 | 82 | 60 | 8 | 72 |
|  | change in thickness of resin layer caused by curing (%) | 36 | 21 | 17 | 20 | 26 | 22 | 18 | 40 | 92 | 28 |
|  | proportion of solid additive (C) remaining in coat layer after curing (%) | 99 | 100 | 100 | 100 | 100 | 65 | 18 | 98 | 10 | 100 |
|  | distance between porous sheet like base materials (E) (E') and reinforcement fiber in fiber reinforced composite material after molding (μm) | 3.3 | 3.9 | 3.8 | 5.1 | 3.5 | 3.7 | 5.3 | 5.4 | — | 24 |
|  | appearance | A | A | A | A | A | A | B | A | C | A |
|  | production time (minutes) | 109 | 109 | 109 | 109 | 109 | 109 | 109 | 109 | 109 | 218 |

A comparison between Examples 20 to 27 and Comparative Example 5 shows that the introduction of a porous sheet-like base material in the resin layer (II) noticeably reduces the change in thickness of the resin layer (II) caused by curing. Furthermore, we found that the solid additive (C) accounted for a large proportion in the coat layer and can exhibit its functions effectively.

A comparison of Examples 20 to 22 with Examples 25 and 26 shows that the proportion of the solid additive (C) present in the coat layer is considerably high when the hole diameter Le of the porous sheet-like base material (E) and the average Lc of the longest diameters across the primary particles of the solid additive (C) have the relation of Le<Lc.

In Comparative Example 5, in spite of a large proportion of the solid additive (C) present in the coat layer, a long production time was required because the curing step had to be performed twice.

The invention claimed is:

1. A method of producing a fiber reinforced composite material having a coat layer on an outer surface thereof comprising heating a preform formed by laminating a prepreg layer (I) comprising at least one prepreg ply including a reinforcement fiber (A) and a thermosetting resin (B-1) with a resin layer (II) including a thermosetting resin (B-2) and a solid additive (C) such that the resin layer (II) is stacked on at least part of the outer surface of the preform to cure the thermosetting resin (B-1) and the thermosetting resin (B-2), the cured resin layer (II') formed by curing the resin layer (II) having an average thickness of 35 μm or more and 300 μm or less,
wherein the resin layer (II) contains a porous sheet-like base material having continuous holes (E) as spacer;
wherein the spacer is a porous sheet-like base material having continuous holes (E) and the hole diameter Le of the porous sheet-like base material (E) satisfies Le<Le where Le is the average of the longest diameters across the primary particles of the solid additive (C), or
wherein the preform is such that a layer (III) formed mainly of a porous sheet-like base material having continuous holes (E') is present between the layer (I) and the resin layer (II), and the hole diameter Le' of the porous sheet-like base material (E') meets the relation of Le'<Le where Le is the average of the longest diameters across the primary particles of the solid additive (C),
wherein the porous sheet-like base material (E) is present nearer to the prepreg layer (I) than the solid additive (C).

2. The method as set forth in claim 1, wherein the curing rate of the thermosetting resin (B-1) is higher than the curing rate of the thermosetting resin (B-2).

3. The method as set forth in claim 1, wherein the particles of the solid additive (C) have a flattened shape with an aspect ratio of 1.2 or more and 300 or less.

4. The method as set forth in claim 1, wherein the average of the longest diameters Lc2 across the dispersed particles of the solid additive (C) is 0.25 μm or more and 300 μm or less.

5. The method as set forth in claim 1, wherein the porous sheet-like base material having continuous holes (E) is a nonwoven fabric, a woven fabric, or a porous film.

6. The method as set forth in claim 1, wherein the prepreg layer (I) comprises a stack of prepreg plies.

7. The method as set forth in claim 1, wherein a thickness of the porous sheet-like base material having continuous holes (E) is 1 μm or more and 50 μm or less.

8. The method as set forth in claim 1, wherein a thickness of the porous sheet-like base material having continuous holes (E') is 1 μm or more and 50 μm or less.

* * * * *